United States Patent Office 2,931,902
Patented Apr. 5, 1960

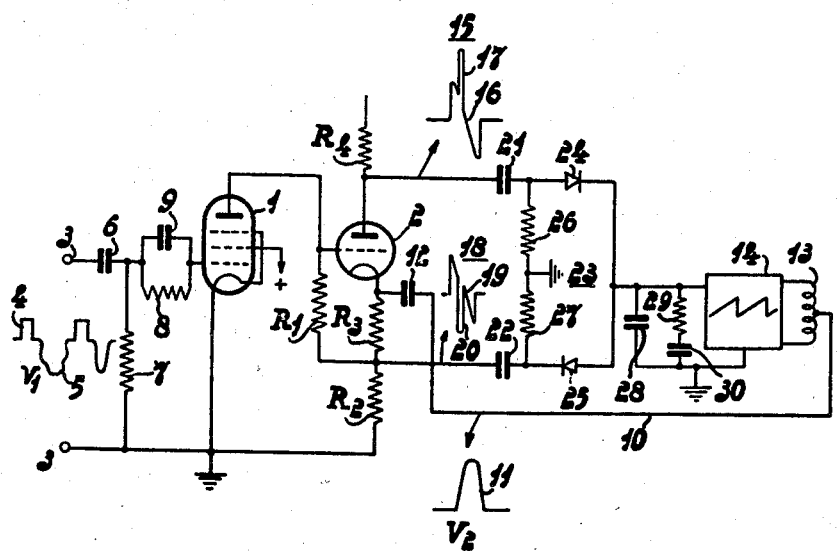

2,931,902

CIRCUIT ARRANGEMENT FOR DERIVING A SUM VOLTAGE AND A DIFFERENCE VOLTAGE FROM TWO VOLTAGES

Antonius Boekhorst, Eindhoven, Netherlands, assignor, by mesne assignments, to North American Philips Company, Inc., New York, N.Y., a corporation of Delaware Application November 15, 1955, Serial No. 546,983

Claims priority, application Netherlands December 8, 1954

3 Claims. (Cl. 250—27)

This invention relates to circuit arrangements for deriving a sum voltage and a difference voltage from two voltages. Such circuit arrangements may, for example, be used in automatic frequency-control circuits of television receivers, where the line sawtooth oscillator is to be synchronised with the line synchronisation pulses. From the line sawtooth oscillator a voltage having a sloping edge, for example a tooth voltage, is derived and supplied in the same phase to two inputs of a phase detector. Two pulse trains in phase-opposition are derived from the incoming line synchronisation pulses. One pulse train is supplied to one input of the phase detector, the second pulse train to the second input. The sum of a sawtooth voltage and a pulse then appear at one input of the phase detector and the difference of a sawtooth voltage and a pulse occurs at the other input.

The present invention has for its object to provide a simple circuit arrangement for producing such sum and difference voltages.

The circuit arrangement in accordance with the invention exhibits the feature that one of the voltages is supplied to an input electrode of a first amplifier, an output electrode of which is connected to a first end of a first resistor, the second end of which is connected to one end of a second resistor, whilst the first end of the first resistor is coupled to a control electrode of a second amplifier and the second end of the first resistor is coupled through a third resistor to a second electrode common to the output circuit of the second amplifier, and the other voltage is supplied to the series combination of the second and third resistors, whilst the sum voltage is taken from a fourth resistor connected in the output circuit of the second amplifier and the difference voltage is derived from the second resistor.

In order that the invention may be readily carried into effect it will now be described with reference to the accompanying drawing, given by way of example, in which the circuit arrangement represented comprises two amplifier tubes 1, 2, the tube 1 being a pentode and the tube 2 being a triode. The anode circuit of the tube 1 comprises the series-combination of two resistors $R_1$ and $R_2$. One end of the resistor $R_1$ is connected to the control grid of the triode 2, and a resistor $R_3$ is connected between the other end and the cathode of the triode 2. The anode of the triode 2 is connected via resistor $R_4$ to the positive terminal of the anode supply, the other terminal of which is grounded. The lower end of the resistor $R_2$ is grounded, as is the cathode circuit of the pentode 1, so that the output circuit of the pentode 1 does not comprise an anode supply battery. The anode direct voltage for the tube 1 is derived from the voltage drop across the resistor $R_2$. Via input terminals 3 the video signal $V_1$ is supplied, together with positively directed synchronisation pulses 4 and negatively directed picture signal 5, to the control grid circuit of the tube 1. The signal 5 is supplied in known manner to the control grid of the pentode 1 via a capacitor 6, resistor 7 and series-resistor 8 together with a parallel connected capacitor 9. At the control grid, peak detection of the synchronisation pulses occurs, the picture signal 5 being beyond the cut-off point of the anode current versus grid voltage characteristic of the tube, so that anode current flows in the tube 1 only during the occurrence of the synchronisation pulses. Hence, negatively directed pulses occur at the anode of tube 1 and pass through the resistors $R_1$ and $R_2$. The pulse of negative polarity through the resistor $R_1$ is amplified in the tube 2, so that a positively driven impulse passes through the anode resistor $R_4$ and a negatively driven pulse through the resistor $R_2$. It is to be noted that the presence of the resistor $R_2$ in the cathode lead of the tube 2 does not produce inverse feedback, since said resistor is not situated in the control grid circuit of the tube 2. The resistor $R_3$, which does produce inverse feedback, might be dispensed with in the case of it being desirable only to produce signals in phase-opposition by way of the resistor $R_2$ and $R_4$.

A voltage $V_2$ of the form denoted by 11 is supplied via a circuit 10 to a differentiating network comprising a capacitor 12 and the series combination of resistors $R_3$ and $R_2$.

The voltage $V_2$ is taken from an inductor or transformer winding 13 of the line-deflection circuit 14 which comprises in known manner a sawtooth oscillator by means of which a sawtooth current is produced in the inductor or transformer winding 13.

During the flyback of the sawtooth current a sinusoidal pulse 11 passes through the inductor 13. Differentiation by means of the network 12, $R_3$, $R_2$ yields a cosine pulse. This pulse passes through the cathode-resistor circuit $R_3$, $R_2$ and the anode resistor $R_4$ with the same polarity.

As a result a voltage denoted by 15 is set up at the anode resistor $R_4$, which voltage consists of the sum of the cosine pulse 16 and the pulse 17. A voltage denoted by 18 and consisting of the difference of the cosine pulse 19 and the pulse 20 is set up across the resistor $R_2$ in the cathode lead of the tube 2.

The voltages 15 and 18 are supplied in known manner via capacitors 21 and 22 respectively to the phase discriminator 23 of known type which comprises diodes 24, 25, resistors 26, 27 and the smoothing network made up of the parallel-combination of a capacitor 28 and the series-circuit of a resistor 29 and capacitor 30.

The control voltage which occurs across said smoothing network and the value of which is determined by the phase-relation of the cosine pulse 16, 19 relative to the pulse 17, 20 is supplied to the sawtooth oscillator of the line-deflection circuit 14.

What is claimed is:

1. A circuit for deriving an algebraic sum voltage and an algebraic difference voltage from two input signal voltages, comprising an electron discharge device having a cathode, a grid and an anode, an output circuit connected to said anode, an impedance circuit connected to said cathode, means connected to apply one of said input signal voltages to said grid, means connected to apply the other of said input signal voltages to said cathode, and means connected to derive said algebraic sum and algebraic difference voltages from said output circuit and from said impedance circuit.

2. A circuit for deriving an algebraic sum voltage and an algebraic difference voltage from two input signal voltages, comprising an electron discharge device having a cathode, a grid and an anode, a source of operating voltage, a first resistor connected between said anode and a terminal of said source of operating voltage, resistance means connected between said cathode and the remaining terminal of said source of operating voltage, a second resistor connected between said grid and a point on said resistance means, means connected to apply one of said input signal voltages to said grid, means connected to apply the other of said input signal voltages to said cathode, and means connected to derive said algebraic sum and algebraic difference voltages from said first resistor and from said resistance means.

3. A circuit for deriving an algebraic sum voltage and an algebraic difference voltage from two input signal voltages, comprising first and second electron discharge devices each having a cathode, a grid and an anode, a source of operating voltage, means connecting the cathode of said first device to a terminal of said source of operating voltage, a resistance means connected between said terminal and the anode of said first device, means connecting the anode of said first device to the grid of said second device, a first resistor connected between the cathode of said second device and a point on said resistance means, a second resistor connected between the anode of said second device and the remaining terminal of said source of operating voltage, means connected to apply one of said input signal voltages to the grid of said first device, means connected to apply the other of said input signal voltages to the cathode of said second device, and means connected to derive said algebraic sum and algebraic difference voltages from said first and second resistors.

References Cited in the file of this patent
UNITED STATES PATENTS

| | | |
|---|---|---|
| 2,432,720 | Brown | Dec. 16, 1947 |
| 2,469,747 | Shenk | May 10, 1949 |
| 2,519,413 | Taylor | Aug. 22, 1950 |
| 2,587,541 | Shenk et al. | Feb. 26, 1952 |
| 2,605,406 | Bartelink | July 29, 1952 |
| 2,662,178 | Levell | Dec. 8, 1953 |
| 2,693,530 | Macdonald | Nov. 2, 1954 |
| 2,761,130 | Kibler | Aug. 28, 1956 |